US012695125B2

(12) United States Patent
Engle et al.

(10) Patent No.: US 12,695,125 B2
(45) **Date of Patent: \*Jul. 28, 2026**

(54) THERMAL RUNAWAY DETECTION SYSTEM FOR BATTERIES WITHIN ENCLOSURES

(71) Applicant: Amphenol Thermometrics, Inc., Saint Marys, PA (US)

(72) Inventors: Brian Allen Engle, New Port Richey, FL (US); Neil Roberts, Ascot (GB)

(73) Assignee: AMPHENOL THERMOMETRICS, INC., Saint Marys, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,804

(22) Filed: Feb. 5, 2024

(65) Prior Publication Data

US 2024/0178468 A1      May 30, 2024

Related U.S. Application Data

(60) Continuation of application No. 18/082,634, filed on Dec. 16, 2022, now Pat. No. 11,942,613, which is a division of application No. 17/021,711, filed on Sep. 15, 2020, now Pat. No. 11,588,192.

(51) Int. Cl.
| | |
|---|---|
| *H01M 10/48* | (2006.01) |
| *H01M 10/42* | (2006.01) |
| *H01M 10/44* | (2006.01) |

(52) U.S. Cl.
CPC ....... *H01M 10/48* (2013.01); *H01M 10/4228* (2013.01); *H01M 10/443* (2013.01); *H01M 10/445* (2013.01); *H01M 2220/20* (2013.01)

(58) Field of Classification Search
CPC .. H01M 10/48; H01M 10/482; H01M 10/486; H01M 10/4228; H01M 10/4207; H01M 10/443; H01M 10/445; H01M 10/441; H01M 2220/20
See application file for complete search history.

(56) References Cited

U.S. PATENT DOCUMENTS

| | | | |
|---|---|---|---|
| 9,083,064 | B2 | 7/2015 | Leport |
| 11,088,405 | B2 * | 8/2021 | Zeng ....................... G01K 1/026 |
| 11,588,192 | B2 * | 2/2023 | Engle .................. H01M 50/578 |
| 11,688,895 | B1 | 6/2023 | Gibbs et al. |
| 11,848,458 | B1 | 12/2023 | Lawes et al. |
| 11,936,063 | B1 | 3/2024 | Goldsberry et al. |
| 11,942,613 | B2 * | 3/2024 | Engle ............... H01M 10/4228 |
| 2013/0312947 | A1 | 11/2013 | Bandhauer et al. |
| 2013/0314094 | A1 | 11/2013 | Farmer et al. |
| 2015/0303723 | A1 | 10/2015 | Raghavan et al. |
| 2016/0116403 | A1 | 4/2016 | Lear et al. |
| 2018/0003685 | A1 | 1/2018 | Cummings et al. |
| 2019/0319316 | A1 | 10/2019 | Fifield |
| 2020/0348365 | A1 * | 11/2020 | Wang ..................... G01K 7/206 |
| 2021/0245627 | A1 * | 8/2021 | Ferguson ............. G05D 1/0291 |

| | | | |
|---|---|---|---|
| 2022/0085428 | A1 | 3/2022 | Engle et al. |
| 2022/0085436 | A1 | 3/2022 | Engle et al. |
| 2022/0407159 | A1 | 12/2022 | Schreiber et al. |
| 2023/0059104 | A1 | 2/2023 | Schreiber |
| 2023/0124972 | A1 | 4/2023 | Engle et al. |
| 2023/0133477 | A1 | 5/2023 | Wiegman |
| 2023/0136701 | A1 | 5/2023 | Wiegman |
| 2023/0178842 | A1 | 6/2023 | Skroski et al. |
| 2023/0312138 | A1 | 10/2023 | Wiegman |
| 2023/0327223 | A1 | 10/2023 | Gibbs et al. |
| 2024/0250380 | A1 | 7/2024 | Goldsberry et al. |
| 2024/0283070 | A1 | 8/2024 | Schreiber |
| 2024/0421370 | A1 | 12/2024 | Gibbs et al. |
| 2025/0105384 | A1 | 3/2025 | Hirata et al. |
| 2026/0126498 | A1 | 5/2026 | Mansour et al. |
| 2026/0128405 | A1 | 5/2026 | Engle et al. |

FOREIGN PATENT DOCUMENTS

| | | | |
|---|---|---|---|
| CA | 3195366 | A1 | 3/2022 |
| CN | 109596158 | A | 4/2019 |
| CN | 109910618 | A | 6/2019 |
| CN | 209181813 | U | 7/2019 |
| CN | 110957542 | A | 4/2020 |
| CN | 111326807 | A | 6/2020 |
| DE | 102019215812 | A1 | 11/2019 |
| EP | 0656535 | A1 | 6/1995 |
| EP | 3579326 | A1 | 12/2019 |
| EP | 3621142 | A1 | 3/2020 |

(Continued)

OTHER PUBLICATIONS

"UM Battery Overcharging Experiment," Powertrain Control Lab, University of Michigan, Feb. 3, 2020, 6 pgs.

Cai, T., et al., "Li-ion Battery Fault Detection in Large Packs Using Force and Gas Sensors," University of Michigan, Oct. 2020, 7 pgs.

Cai, T., et al., "Modeling Li-Ion Battery Thermal Runaway Using a Three Section Thermal Model," Proceedings of the ASME 2018 Dynamic Systems and Control Conference, DSCC2018, Sep. 30 to Oct. 3, 2018, Atlanta, GA, USA, 10 pages.

Feng, X., et al., "Time Sequence Map for Interpreting the Thermal Runaway Mechanism of Lithium-Ion Batteries With LiNixCoyMnzO2 Cathode," Frontiers In Energy Research, www.frontiersin.org, Nov. 2018, vol. 6, Article 128, pp. 1-16.

Golubkov, A. W., et al., "Thermal-runaway experiments on consumer Li-ion batteries with metal-oxide and olivin-type cathodes," RSC Adv., 2014, 4, pp. 3633-3642.

Improved Li-ion Battery Safety Through Off-Gas Monitoring, Presented to the ESS Safety & Reliability Forum, Albuquerque, NM, Mar. 7, 2019, 22 pages.

(Continued)

*Primary Examiner* — Raymond Alejandro
(74) *Attorney, Agent, or Firm* — CANTOR COLBURN LLP

(57) ABSTRACT

A battery thermal runaway detection sensor system for use within a battery enclosure housing one or more batteries. The system has at least one gas sensor for detecting a venting condition of a battery cell of hydrogen, carbon monoxide or carbon dioxide, and providing a sensed output in real time. A microcontroller determines power management and signal conditioned output on the concentration of specific battery venting gases based on the sensed output from said at least one gas sensor.

12 Claims, 6 Drawing Sheets

(56) References Cited

FOREIGN PATENT DOCUMENTS

| EP | 3633754 A1 | 4/2020 |
| JP | 2015005359 A | 1/2015 |
| JP | 2016148525 A | 8/2016 |
| JP | 2018133189 A | 8/2018 |
| KR | 19990085939 A | 12/1999 |
| KR | 20190082540 A | 7/2019 |
| KR | 102051809 B1 | 11/2019 |
| WO | 2020172427 A1 | 8/2020 |
| WO | 2021168327 A1 | 8/2021 |
| WO | 2023173045 A1 | 9/2023 |
| WO | 2026097014 A1 | 5/2026 |

OTHER PUBLICATIONS

International Search Report for PCT/US2021/050471, international filing date of Sep. 15, 2021, date of mailing Dec. 7, 2021, 5 pages.
Lamb, J., et al., "Failure propagation in multi-cell lithium ion batteries," Journal of Power Sources, vol. 283; Issue C, DOE pp. 2014-10-22, 25 pages.
Lammer, M. et al., "Holistic methodology for characterisation of the thermally induced failure of commercially available 18650 lithium ion cells," RSC Adv., 2017, 7, 24425-24429.

Lebedeva, N., et al., "Emissions from Li-Ion Battery Cells and Associated Safety Concerns: Research and Innovations Needs," The European Commission's Science and Knowledge Service, Joint Research Centre, Jan. 2020, 29 pgs.
Pannala, S., et al., "Mechanical Measurements for Early Detection of Thermal Runaway Induced By an Internal Short Circuit," Abstract, 233rd ECS Meeting, Seattle, WA, May 13-17, 2018, 3 pages.
Srinivasan, R., et al., "Preventing Cell-to-Cell Propagation of Thermal Runaway in Lithium-Ion Batteries," 2020, J. Electrochem. Soc., 167, 020559, 7 pages.
Written Opinion for PCT/US2021/050471, international filing date of Sep. 15, 2021, date of mailing Dec. 7, 2021, 8 pages.
European Application No. 21870138.1-1009; Extended European Search Reported dated Dec. 2, 2024; 19 pages.
JP Office Action issued Jun. 24, 2024, jP Applicationn No. 2023517781, Translation, 5 pages.
Korean Office Action, Application No. 10-2023-7012745, mailed May 26, 2025, with English Translation, 20 Pages.
Korean Office Action, Application No. 10-2023-7012745, mailed Feb. 19, 2026, with English Translation, 16 pages.
CA Office Action; App No. 3195366; Issued Jun. 8, 2026 in AOE0240003CA; pp. 1-6.
CN Office Action with English Translation; Appl No. 202180074426. X; Issued Jun. 16, 2026 in AOE0240003CN; pp. 1-12.

* cited by examiner

PLOT OF HYDROGEN CONCENTRATION RISE IMMEDIATELY AFTER INITIAL VENT
FOLLOWED BY SLIGHT PRESSURE RISE WITHIN THE ENCLOSURE OVER ONE MINUTE
LATER AS GAS EXPANSIN EXCEEDS PACK LEVEL VENTING CAPACITY

CO2 IN PHASE 1 THERMAL RUNWAWAY

THERMAL RUNAWAY DETECTION SYSTEM FOR BATTERIES WITHIN ENCLOSURES

CROSS-REFERENCE TO RELATED PATENT APPLICATION

This application is a continuation of U.S. patent application Ser. No. 18/082,634, filed on Dec. 16, 2022 now U.S. Pat. No. 11,942,613 issued 26 Mar. 2024, which is a divisional of U.S. patent application Ser. No. 17/021,711, filed on Sep. 15, 2020 (now U.S. Pat. No. 11,588,192 issued 21 Feb. 2023) and all the benefits accruing therefrom under 35 U.S.C. § 119, the contents of said applications are herein incorporated by reference in their entirety.

BACKGROUND

The disclosure relates generally to a detection system for detecting battery failure and more particularly to a detection system for detecting thermal runaway of batteries within enclosures, for example, batteries used with electric vehicles, FIG. 2(a), or stationary battery energy storage systems, FIG. 2(b).

Referring to FIGS. 1(a), 1(b), thermal runaway in lithium based batteries is a process under which an exothermic reaction occurs within a failed cell that increases the internal temperature, which in turn releases energy that sustains the internal degradation reactions and increases the temperature until ultimate failure of the cell, often accompanied by explosive release of the electrolyte, and often resulting in fire. In modern lithium batteries, the risk of explosion can be reduced by design to incorporate a controlled venting location in the cell (see FIG. 4), but risk of fire and explosion due to thermal runaway has not been eliminated in most liquid electrolyte lithium-based batteries.

Turning back to FIGS. 1(a), 1(b), certain triggers and abuse conditions can lead batteries, e.g., lithium-ion cells, to breakdown or failure, which in turn can result in a thermal runaway. Thermal runaway can be caused, for example, by external short circuit, internal short circuit (particle, dendrites, separate failure, impact/puncture), overcharge, overdischarge, external heating, or over-heating (self-heating). With elevated temperatures is the generation of gas. If heat dissipation occurs faster than heat generation, there can be a safe outcome.

If left unhindered or if the heat cannot be dissipated faster than it is being generated, this can result in a rapid increase in temperature, release of flammable and hazardous gases during venting, flames, and explosion. This can especially be problematic for vehicles having large format battery systems, as shown in FIG. 3, and in particular battery electric vehicles and stationary storage, where the thermal runaway of a single cell (FIG. 4) can lead to a cascade of thermal runaway events that can engulf the entire pack, resulting in catastrophic fire and release of hazardous gases.

Sensors have been developed to detect thermal runaway. However, simple gas sensors, such as a hydrocarbon sensor, can only detect electrolyte gas concentration, but suffer from cross sensitivity to other gases as well as substantial drift and so make poor long-life thermal runaway detection sensors.

No admission is made that any reference cited herein constitutes prior art. Applicant expressly reserves the right to challenge the accuracy and pertinence of any cited documents and information.

SUMMARY

A detection system is disclosed that addresses the challenges of fast, robust thermal runaway detection within a battery enclosure that is generally agnostic to electrochemistry, cell packaging (cylindrical, prismatic, or pouch), as well as battery configuration (series/parallel) by identifying attributes of initial cell venting that are shared between numerous design types and responding to venting gases of a failing cell.

During thermal runaway, the cell converts substantial cathode and electrolyte material into gas and vents the pressurized gas mixture in time spans of seconds when the faulted cell is at a high State of Charge, FIG. 1(b). Of the typical cell chemistries such as lithium-manganese-cobalt-oxide (NMC) batteries, Lithium Cobalt Oxide (LCO), and Lithium Iron Phosphate (LFP) batteries, thermal runaway testing has shown the release of several gases, including large quantities of carbon dioxide and hydrogen, see FIG. 5. Carbon dioxide is generally evolved during the oxidation reaction of carbonate solvents and hydrogen is generally released as a product of the reduction of water deriving from combustion reactions by carbon monoxide and/or free lithium, with methane and ethane compounds also present from reduction reactions of the electrolyte and ethylene carbonate at the lithiated anode.

This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1A:
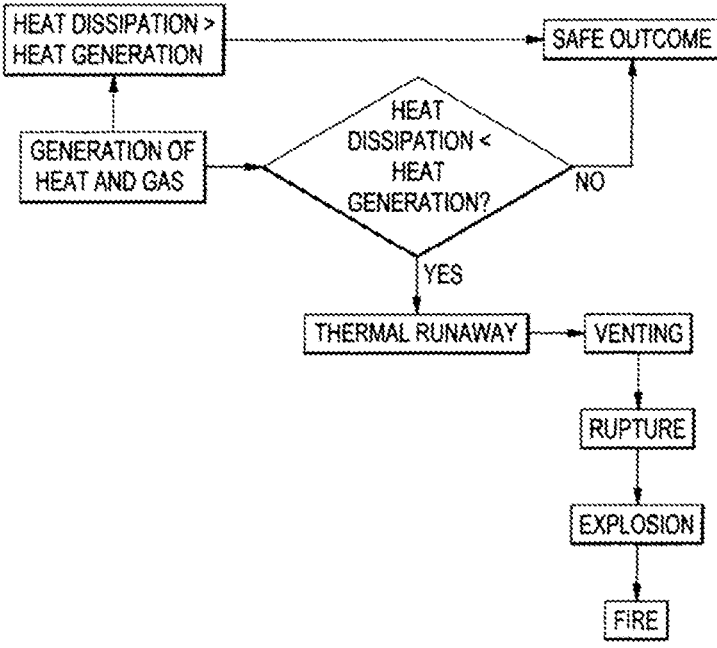
FIG. 1(a) is a flow diagram showing the progression of thermal runaway.
Figure 1B:
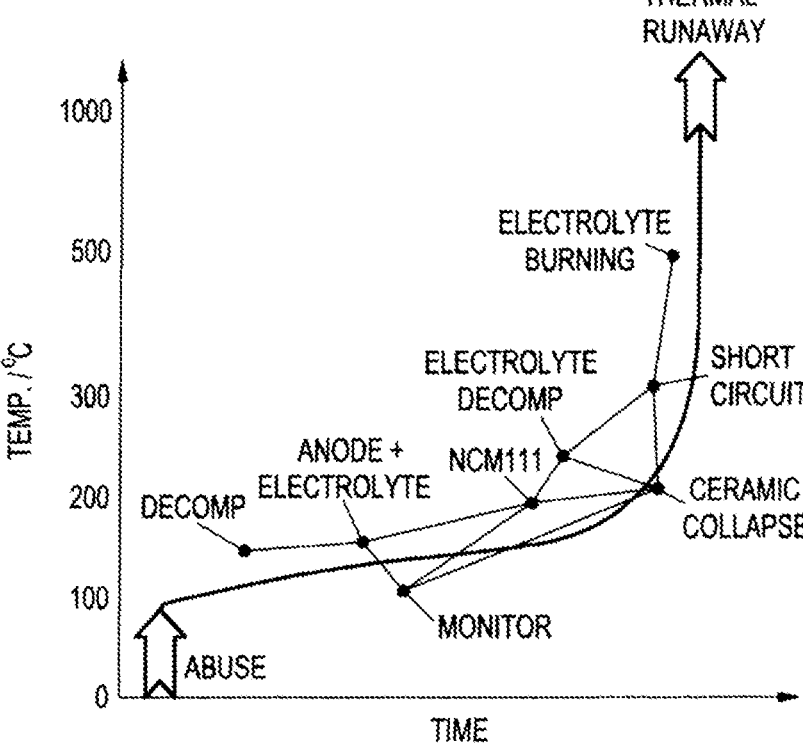
FIG. 1(b) is a chart of thermal runaway and temperature.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Figure 3:
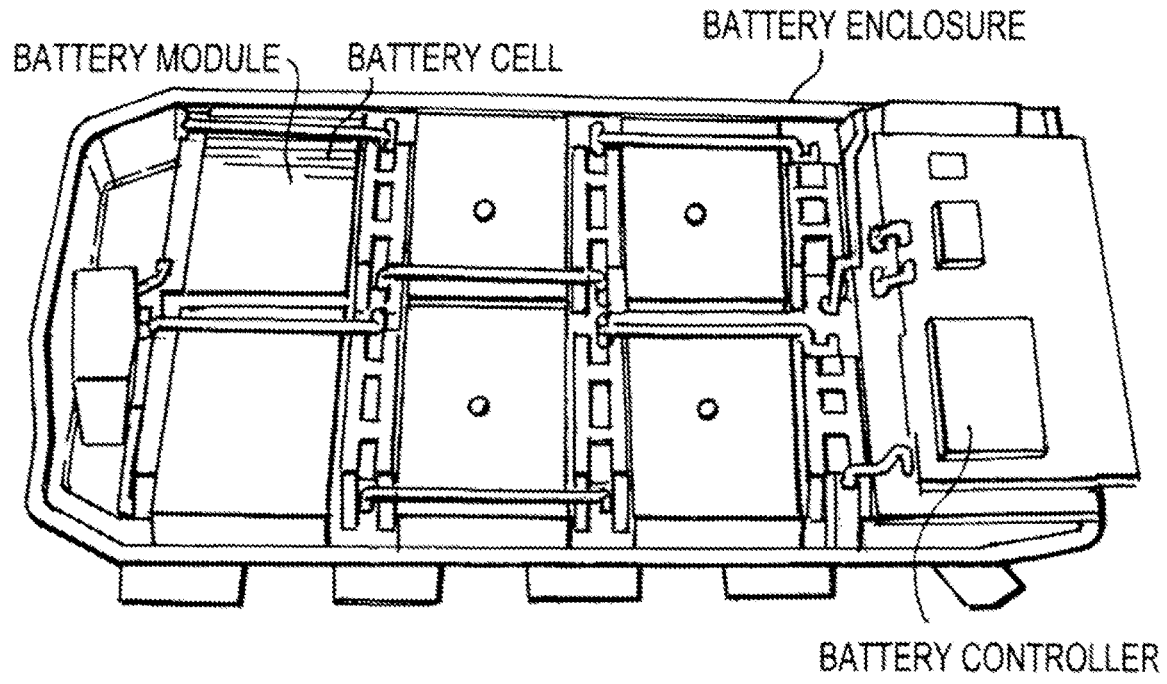
FIG. 3 shows a battery thermal runaway detector.
Figure 4:
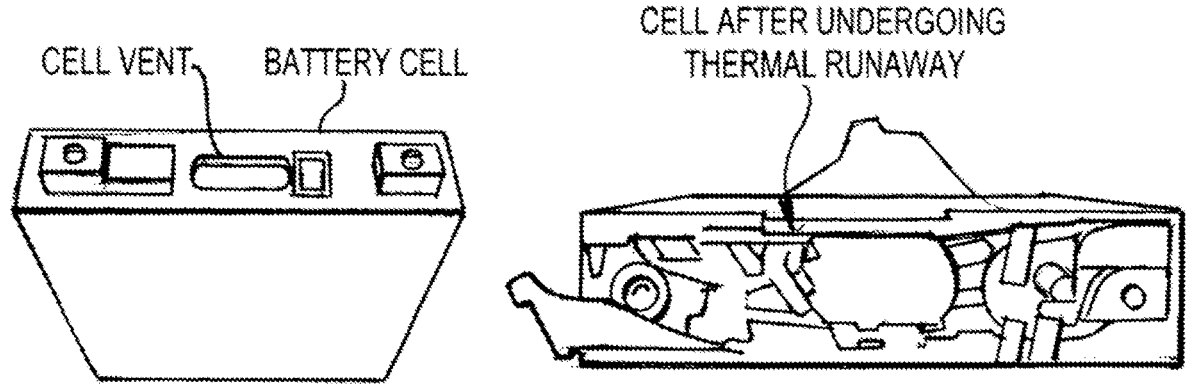
FIG. 4 shows a typical battery cell before and after thermal runaway.
Figure 5:
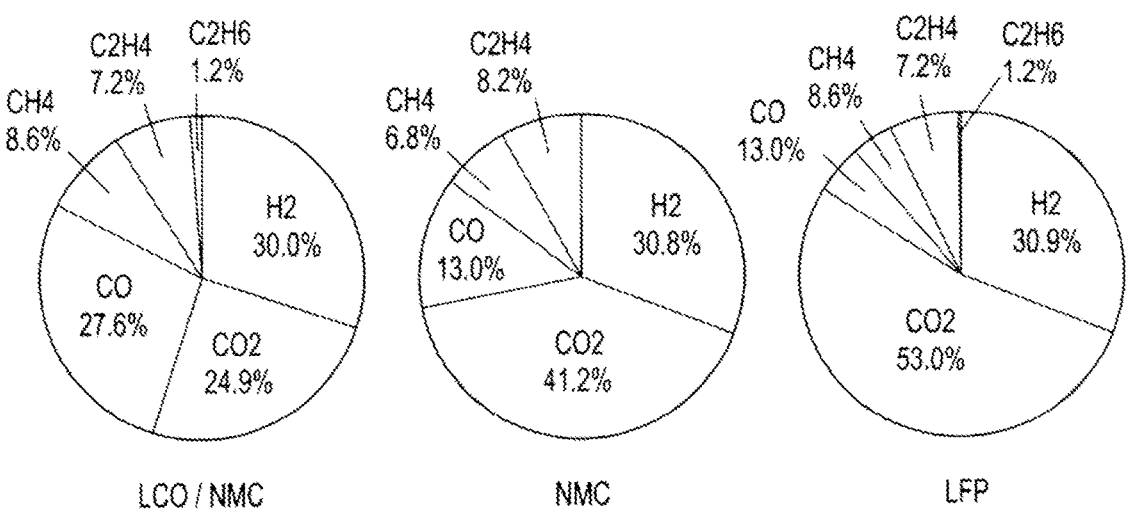
FIG. 5 is a diagram of gas released from thermal runaway events in cells with different electro-chemistries: LCO/NMC, NMC, and LFP.

The Battery Thermal Runaway Detector is predisposed within the void airspace of a typical battery enclosure, for example as shown in FIG. 3. The enclosure completely surrounds one or more battery modules, each battery module having one or more battery cells aligned in parallel or series with one another. The battery cells of each module are in electrical communication with the adjacent cells, and the battery modules are in electrical communication with each adjacent module. A battery controller is in communication with each battery module and/or battery cell. The battery controller can operate each battery cell either directly or via the module, such as to turn the cell on/off or control the voltage output of each cell.

The enclosure protects the battery cells and modules from water, debris, and to protect users and occupants from the electrical hazards within the enclosure. Enclosure void space volumes (the volume of air space within the enclosure) can vary from as little as a few liters to as much as 200 or more liters, typically containing air. The battery enclosure is generally provided with air venting features inclusive of a single or multiple small openings that allow for pressure equilibrium inside and outside the enclosure to prevent strain and damage to the pack. These openings are generally protected with hydrophobic membranes that allow for air exchange but prevent the direct flow of liquid water into the enclosure. The enclosure may also include valves or similar devices to allow over pressure from a thermal runaway to safely vent from the enclosure, reducing risk of explosion and harmful shrapnel.

Figure 9:
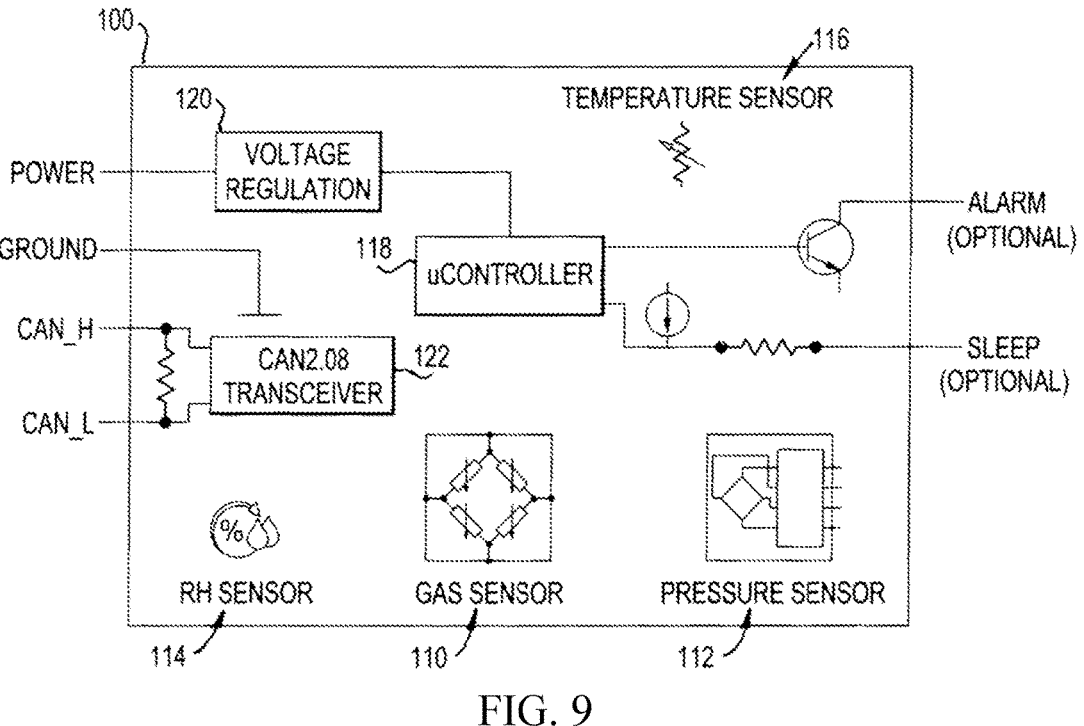
FIG. 9 is a schematic of thermal runaway management system.

Turning to FIG. 9, a thermal runaway detector or detection system 100 is shown in accordance with one non-limiting example embodiment of the present disclosure. The detection system 100 resides within the battery enclosure void space as in FIG. 3 and includes a primary detector, here a gas detector 110. The detection system 100 also includes a pressure sensor 112, relative humidity (RH) sensor 114, and/or temperature sensor 116. The gas detector 110 has one or more sensors, and in one embodiment has a $CO_2$ gas sensor, carbon monoxide sensor, and/or a $H_2$ gas sensor. The detectors/sensors 110-116 are positioned about the enclosure, and any suitable combination of detectors and/or sensors 110-116 can be utilized.

The thermal runaway detection system 100 also contains a voltage regulator 120 that provides and regulates sufficient power to operate the sensors 110-116, microcontroller or microprocessor 118, and communications transceiver 122. The sensor elements 110-116 are electrically connected to the microcontroller 118 within the detection system 100. The microcontroller 118 interprets the sensor output from each of the sensors 110-116, and provides necessary signal conditioning to convert the raw sensor signals to engineering values for each component. The values are then transmitted to the communications transceiver 122, which provides a data stream of sensor information to the battery management system master controller or other electronic monitoring system.

Figure 8:
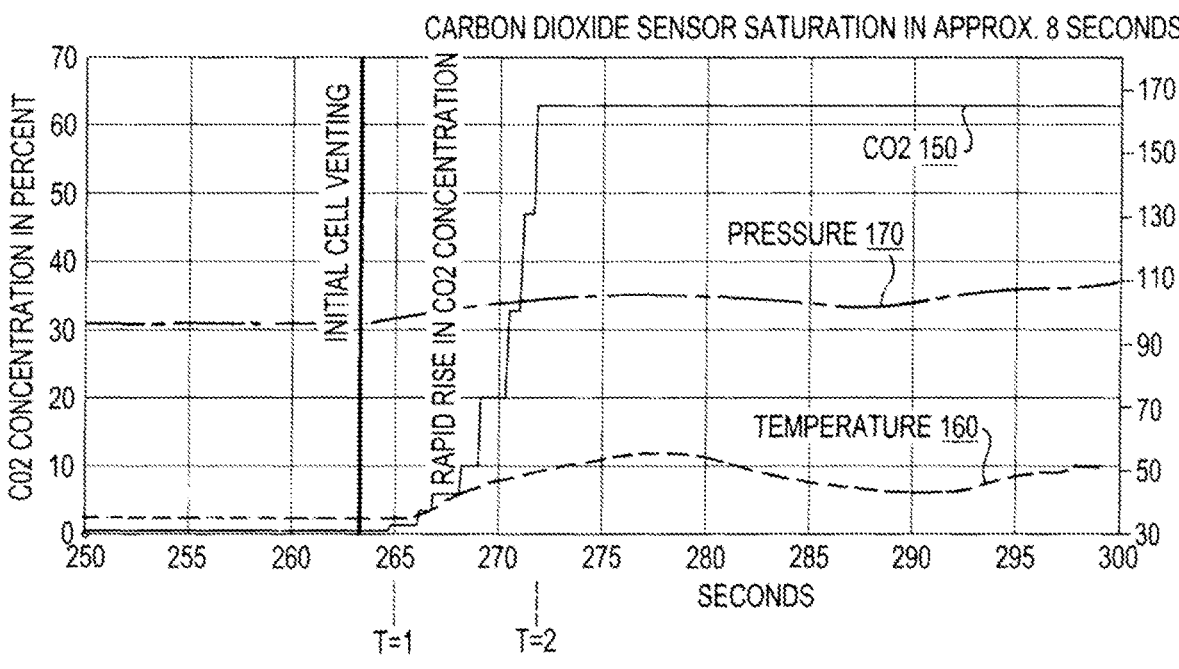
FIG. 8 is a plot of thermal runaway initiation showing rapid carbon dioxide concentration rise within the enclosure.

When a $CO_2$ gas sensor 110 is used as one of the primary gas sensors 110, it detects carbon dioxide levels in the enclosure (FIG. 3) and has long term reliability and a fast response time (under 6 seconds to record an event). Carbon dioxide background concentration levels are generally less than 1,000 ppm, during a battery cell venting conditions, these concentrations can easily exceed 60,000 ppm within the enclosure, providing very robust gas signal for detection, as shown in FIG. 8. With ejecta speeds during venting often exceeding 200 m/s, diffusion of carbon dioxide within the enclosure void space happens very rapidly, reaching the gas sensor 110 within 2 seconds or less regardless of the sensor proximity to the venting cell.

Figure 7:
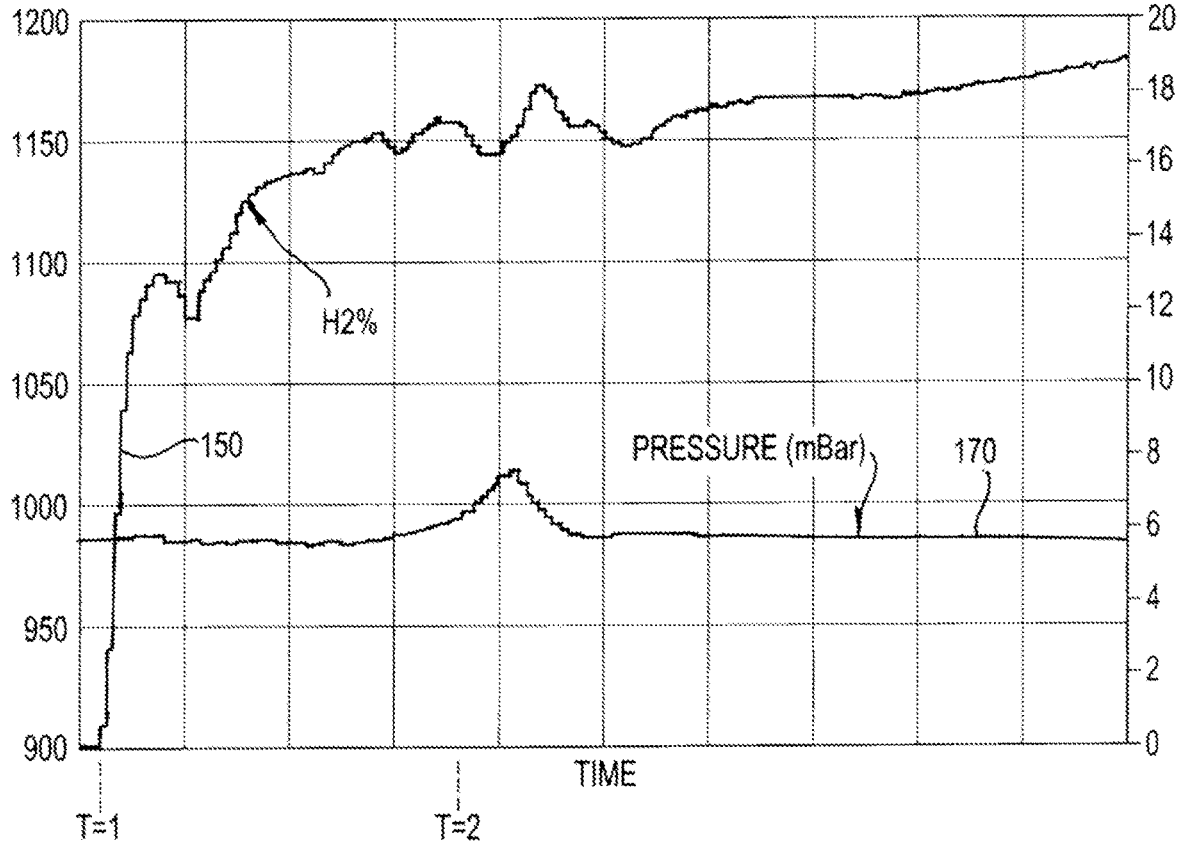
FIG. 7 is a plot of hydrogen concentration rise immediately after initial vent followed by slight pressure rise within the enclosure over one minute later as gas expansion exceeds pack level venting capability.

In a similar fashion, background concentrations of hydrogen in atmospheric air are generally around 200 to 300 ppb. Under battery cell venting conditions, hydrogen concentrations inside the battery enclosure can easily exceed 140,000 ppm, also providing a robust signal to noise ratio for gas detection, as shown in FIG. 7.

Figure 6:
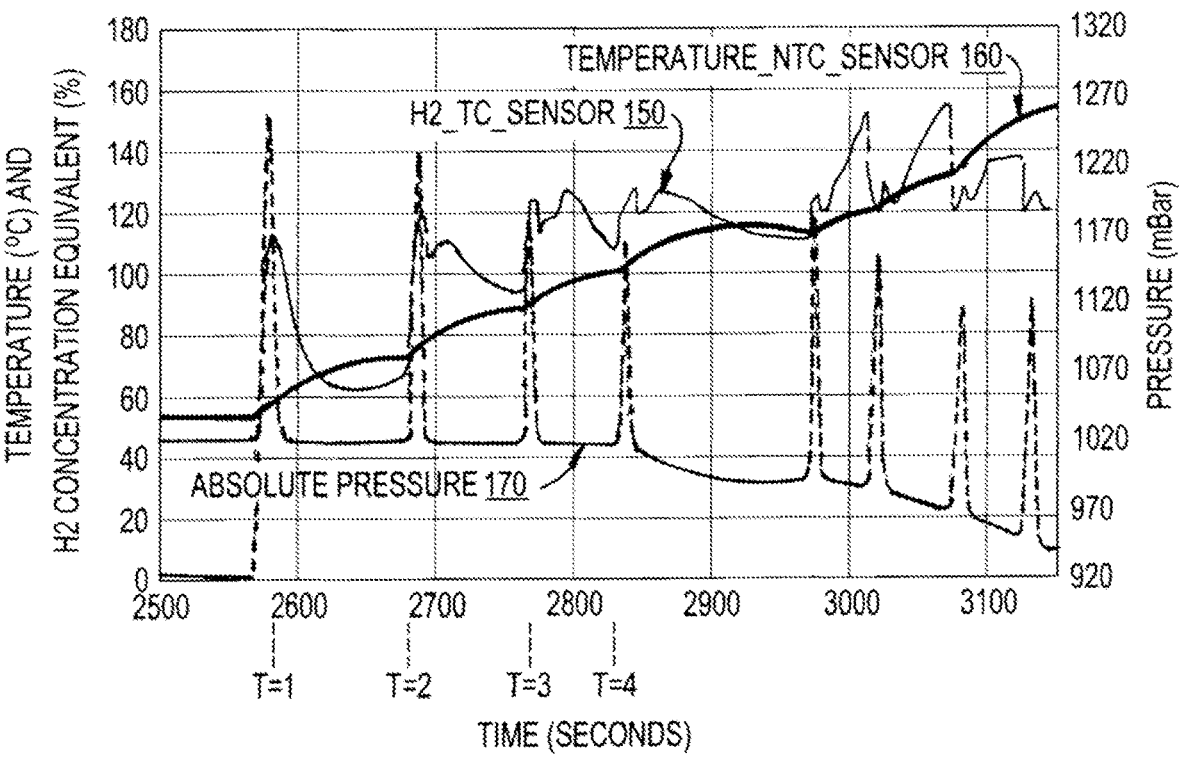
FIG. 6 is a plot of cascading thermal runaway propagating through pack enclosure wherein initial cell triggered thermal runaway in several adjacent cells.

The pressure sensor 112 detects the gas pressure levels in the void space of the battery enclosure. Nominal air pressure within the enclosure approximates atmospheric pressure. During thermal runaway venting, the pressure may rise abruptly if the venting phase is highly energetic, as in the case of a cell that is at 100 percent state of charge as shown in FIG. 6. But the initial accompanying pressure rise may also be very low, especially in the case of smaller cells or cells whose state of charge is much lower, as shown in FIG. 8. While there is dependence on the enclosure venting system, an increase in gas pressure or temperature can provide information on the rate of thermal runaway. The pressure sensor 112 is small and low cost, has a fast time response with low power consumption, but has been shown to provide poor data during slow venting phenomenon where the battery enclosure venting system allows release of the trapped gas at a rate that offsets gas generation. When used to supplement the gas sensor 110, however, the pressure sensor 112 can provide valuable insight as to the progression of the thermal runaway as it cascades from the initiation cell to adjacent cells within the enclosure, as shown in FIG. 6, where the consecutive increases in hydrogen gas concentration and accompanying pressure spikes indicate that the thermal runaway has progressed to additional cells.

The temperature sensor 116 detects the temperature within the enclosure void space, and like the pressure sensor 112, can be used in conjunction with the gas sensor 110 to estimate the rate of progression of the thermal runaway (FIG. 6). Progressive increases in temperature that accompany each successive cell thermal runaway provide critical data in determine if the reaction has stopped or is progressing at such a rate as to require immediate safety measures, such as disabling the system providing protective countermeasures.

The relative humidity sensor 114 monitors the humidity within the void space of the enclosure and can also be used in conjunction with the gas sensor 110 to observe substantial changes in water vapor within the enclosure indicative of the formation of water vapor due to the decomposition reaction.

Figure 2A:
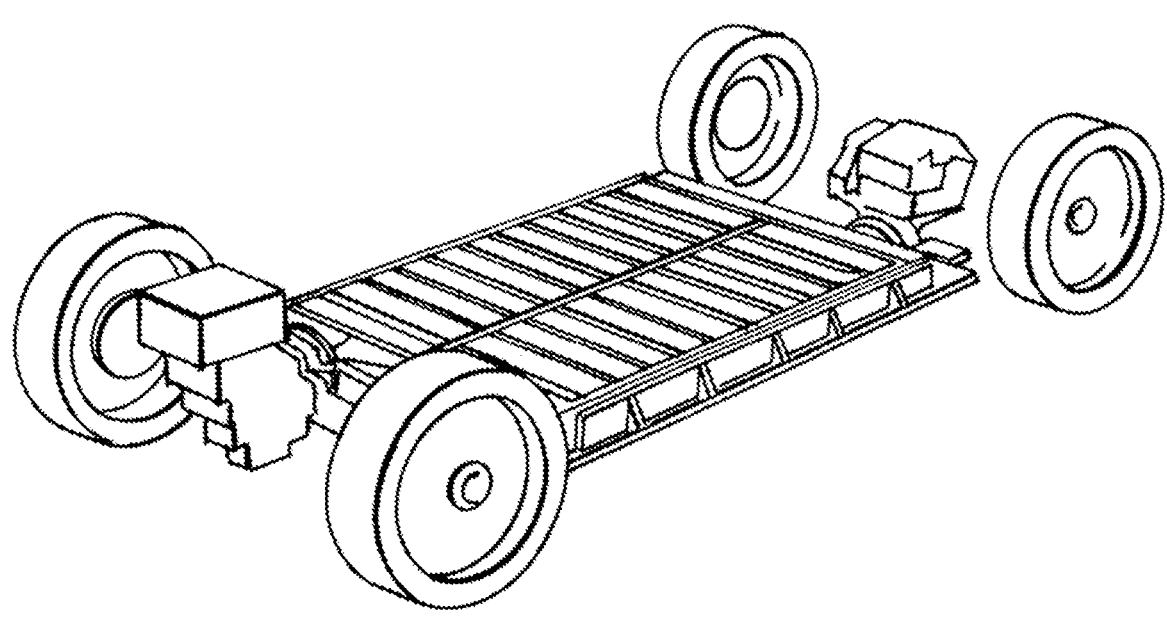
FIG. 2(a) is a typical battery pack in an electric vehicle.
Figure 2B:
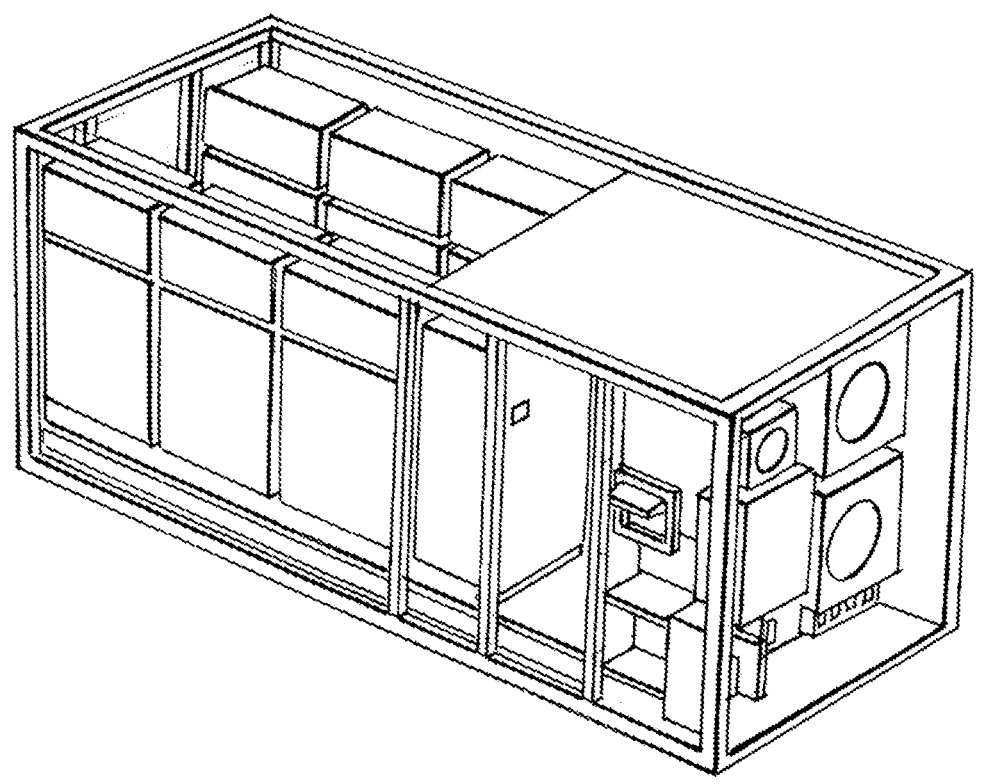
FIG. 2(b) is a drawing of a typical battery pack in an energy stationary storage enclosure.

The detection system 100 can be utilized for a variety of suitable applications. In the embodiment shown in FIGS. 2(*a*), 3, the detection system 100 is implemented in a vehicle having a battery enclosure, a power distribution unit, and a battery controller and/or Motor Control Unit (MCU). The battery enclosure can be made up of a plurality of battery cells and housed inside a battery enclosure.

The sensors 110-116 each output a sensed signal to a processing device, such as the microcontroller 118. The microcontroller 118 converts the analog sensor signal to engineering values and transmits that data, such as in the form of an alarm signal or output signal, to the Battery Management System via a wired or wireless transceiver 122. The microcontroller 118 can also determine if the values from the sensors 110-116 exceed a critical threshold value for that sensor to indicate cell venting as well as provide algorithms to determine if the sensors 110-116 are operating normally and within specifications. The detection system 100 may utilize redundant sensors 110-116 to meet Safety Index Levels.

One or more of the sensors 110-116 are located in a free space within the battery enclosure (FIG. 3) of the vehicle, so that the sensors 110-116 are in communication (e.g., gas or pressure communication) with the air space proximate to the batteries and/or battery compartment and receive and detect the conditions resulting from a battery cell venting. The sensors 110-116 provide the output to the processing device 118, which can determine if the sensed condition exceeds a predetermined threshold or if there is a rapid change in the sensed condition. The entire system 100, including the sensors 110-116, microcontroller 118, regulator 120, and transceiver 122, can all be housed in a single sensor housing and positioned at one location in the battery compartment. In another embodiment, the system 100 can be separate devices each with their own housing and each housing positioned at separate locations in the battery compartment, including surface mounted on the battery management system electronics.

As shown and described, the detection system addresses the problem of robust detection of thermal runaway in lithium ion batteries, where the outgassing precursor to thermal runaway can occur in timespans of seconds or hours. The detection system measures multiple physical parameters of the outgassing event that can allow detection of rapid thermal runaway as well as slower events. The multiple detection technology reduces the risk of alpha/beta errors and provides sufficient redundancy to meet market safety requirements. The system measures, at a minimum, hydrogen and/or carbon dioxide concentration, and may be supplemented with air pressure and or temperature and humidity in the enclosure.

In other variants, the detection system could also include hydrocarbon detection of the electrolyte, including methane, esters, and ethane gases. During the initial cell venting that precedes thermal runaway, vented gases include H2, CO, $CO_2$, and hydrocarbons in sufficient concentration to be detected by the individual sensors. By combining them into a single sensor platform with signal conditioning and analysis, it is possible to determine with relative certainty that the event is a single cell undergoing thermal runaway, and by monitoring the gases simultaneously, determine the difference between less urgent electrolyte leakage and more urgent thermal runaway condition. The use of the principle of thermal conductivity for hydrogen and non-dispersive Infrared measurement of $CO_2$ sensor are robust, absolute measurement devices that have limited cross sensitivity to other gases, making them ideal for this application where there is little or no opportunity to recalibrate or service the devices in the field.

Referring more specifically to FIG. 6, an example runaway is shown. In this illustrative example, the thermal runaway cascades from one cell to adjacent cells. Starting at T=0, the battery system is operating under normal conditions, and the hydrogen level 150, temperature 160, and pressure 170 are all normal. At a first time period, T=1, a first single battery cell of a first battery module experiences thermal runaway. As a result, it releases a gas, here Hydrogen. The hydrogen sensor of the gas detector 110 measures the hydrogen level, and has a sensed gas level output. It transmits the sensed gas level output to the microcontroller 118. In addition, the pressure sensor 112, detects the pressure, and has a sensed pressure output. It then transmits the sensed pressure output to the microcontroller 118. Further, the temperature sensor 116 measures the temperature in the enclosure, and provides a sensed temperature output. It transmits the sensed temperature output to the microcontroller 118.

The sensors 110-116 immediately send the sensed outputs to the microcontroller 118 in real time without delay or manual intervention. The sensors 110-116 can send sensed outputs to the microcontroller 118 continuously or at intermittent random or predetermined periods (such as several times a second).

In the example embodiment of FIG. 6, a cascading thermal runaway event is shown propagating through pack enclosures where initial cell triggers thermal runaway in adjacent cells. The microcontroller 118 receives a sensed gas, pressure and temperature outputs from the gas, pressure and temperature sensors 110, 112, 116, respectively. At T=1, the hydrogen gas level 150 and pressure 170 both exhibit a spike. However, the temperature 160 only increases slightly. The venting in the battery enclosure enables the pressure 170 to quickly dissipate back to normal levels, though the Hydrogen vents more slowly and stays at an elevated level. Based on these conditions and receipt of the sensed outputs, the microcontroller 118 determines that at least a first battery cell has experienced a thermal runaway event, and generates an alarm signal that it sends to the battery controller. The battery controller, in response, might for example take a first response, such as to indicate to the operator that service is needed, to reduce the voltage requirements for the battery module, or to control the battery so that it does not get as hot.

At T=2 in the example embodiment of FIG. 6, another cell experiences a thermal runaway. Here, the microprocessor 118 determines, based on sensed outputs from the gas sensor 150 and pressure sensor 160, that there is another spike in gas and pressure, respectively, and that the temperature has again increased slightly. The pressure again returns to normal rather quickly due to venting conditions, but the temperature and hydrogen level continue a rising pattern. Accordingly, the microprocessor 118 determines that another thermal runaway event has occurred, and sends another alarm signal to the battery controller. The battery controller can continue to take the same response, or can escalate the response such as by shortening the alert response time, for example by indicating that immediate service is needed, or by turning off one or more of the battery modules. The microcontroller 118 determines that there are further spikes at T=3, 4. The various levels of gas, temperature and pressure may vary based on venting conditions and the specific thermal runaway event. For example, following T=4, the pressure may decrease as the enclosure hydrophobic vents fail, though spikes occur with each successive cell thermal runaway event as additional cells fail within the enclosure. The microcontroller 118 or battery controller can further determine that there is a cascading pattern to the event and take additional responsive actions. The responsive actions can be sent from the battery controller to the microcontroller 118 via the transceiver 122, which then controls operation of the cells and modules.

Turning to FIG. 7, another example thermal runaway event is shown. Here, the system 100 has a gas sensor 110, here a Hydrogen sensor, and a pressure sensor 112. At T=1, the hydrogen concentration 150 rises immediately after initial vent, followed by a slight pressure 170 increase at T=2 (one minute after T=1) within the enclosure as gas expansion exceeds pack level venting capability. Thus, at T=1, the microprocessor 118 generates an alert that thermal runaway has initiated. The pressure rise at T2 in FIG. 7 demonstrates the delayed response of pressure signal in this instance, wherein there exists hydrogen gas above the Lower Exposure Limit at T1, yet the pressure does not substantially increase for over one minute.

Turning to FIG. 8, yet another example embodiment is shown. Here, the gas detector 110 is a carbon dioxide sensor. The plot shows rapid carbon dioxide concentration 150 rise within the enclosure, while pressure 170 remains the same and the temperature 160 exhibits a slight increase. At T=2, the microcontroller 118 determines that a thermal runaway has occurred, and generates an alarm that it sends to the battery controller.

Thus, the microcontroller 118 uses the sensed outputs from the gas, pressure, RH, and/or temperature sensors 110, 112, 114, 116, respectively, to determine if there is a thermal runaway event or other condition within the battery enclosure. The microcontroller 118 can base that determination on a single sensed output, or on a combination of sensed outputs. For example, the microcontroller 118 can determine based on the presence of a gas spike alone, that a thermal runaway might be occurring and then refer to the sensed pressure output and/or the sensed temperature output to determine if the thermal runaway event is cascading to additional cells throughout the pack by utilizing a combination of gas measurement to determine initial thermal runaway event and monitoring for increases in pressure or temperature to assess the magnitude of the event. Increasing temperature or pressure within the pack coincident with high gas concentration levels are indicative that countermeasures have not isolated the event to a single cell, and generate an alert escalating a response. For example, the initial alert could be to notify the vehicle owner to take the vehicle in for service as soon as possible, and the escalating alert could be to notify the vehicle occupants to bring the vehicle to the side of the road, exit the vehicle and the BMS would shut the vehicle down except for the heat exchanger system to try to slow the process down. However, if the temperature and pressure do not increase, the microcontroller 118 can determine that the thermal event has ceased and has been isolated to a single cell or group of cells, and not generate an alert escalating the response. Thus, in the example given, the alert would continue to notify the vehicle owner to have the vehicle serviced.

It is noted that a microcontroller 118 is provided to receive the sensed outputs, determine spikes and send an alarm to the battery controller via the transceiver 122. However, the microcontroller operation can instead be performed by the battery controller itself, and sensed outputs can be transmitted, via the transceiver, to the battery controller. And responsive action signals can be sent directly from the battery controller to the cells, via the transceiver 122.

Advantages of the detection system 100 include, for example, the use of known, validated and field proven sensor technology, leveraging a specific combination of sensors to allow for layering of the detection mechanisms related to chemical and thermal physics of phenomena associated with the thermal runaway event. The system requires little, if any customization to be suited for various xEV enclosure size/cell configuration/electrochemistry. The system also has very fast time response (generally 3 to 5 seconds) in an environment where positive detection of thermal runaway requires fast response with minimal risk of missed/false detection. The system is compact and can be operated in multiple modes for reduced parasitic power consumption when the battery enclosure is neither actively charging nor discharging. These modes can be controlled within the sensor assembly 100 utilizing information received from the battery Management system on active mode (either driving or charging, where fast detection is critical and power consumption less important, or in passive mode, where power consumption is critical and sampling rate can be reduced to reduce device power consumption.

The system and method of the present invention include operation by one or more processing devices, including the microprocessor 118. It is noted that the processing device can be any suitable device, such as a processor, microprocessor, controller, application specific integrated circuit (ASIC), or the like. The processing devices can be used in combination with other suitable components, such as a display device, memory or storage device, input device (touchscreen), wireless module (for RF, Bluetooth, infrared, WiFi, etc.). The information may be stored on a computer medium such as a computer hard drive, or on any other appropriate data storage device, which can be located at or in communication with the processing device. The entire process is conducted automatically by the processing device, and without any manual interaction. Accordingly, unless indicated otherwise the process can occur substantially in real-time without any delays or manual action.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

What is claimed is:

1. A battery thermal runaway detection system for use within a battery enclosure housing one or more batteries, the detection system comprising:

at least one a hydrogen sensor configured to act as a primary detector and configured to provide a sensed output in real time;

at least one carbon dioxide sensor configured to act as a secondary detector and configured to provide a sensed output in real time;

a microcontroller electrically connected to the primary and secondary detectors and configured to determine power management and provide a signal conditioned output of a concentration detected by the primary and secondary detectors;

a battery controller connected to the microcontroller;

wherein the primary and secondary detectors are configured to differentiate between background and battery cell venting conditions; and wherein said microcontroller provides a rate of progression of the thermal runaway based on the provided information from said secondary detector.

2. The thermal runaway detection system of claim 1, wherein the background condition is characterized by hydrogen and carbon dioxide concentrations of atmospheric ambient.

3. The thermal runaway detection system of claim 1, wherein the cell venting condition is characterized by an increase in hydrogen and carbon dioxide concentrations above atmospheric ambient.

4. The thermal runaway detection system of claim 2, wherein the hydrogen sensor is configured to detect greater than 300 ppm hydrogen.

5. The thermal runaway detection system of claim 3 wherein the carbon dioxide sensor is configured to detect greater than 1,000 ppm carbon dioxide.

6. The thermal runaway detection system of claim 1, further comprising a pressure sensor.

7. The thermal runaway detection system of claim 6, wherein the pressure sensor is configured to provide information to the microcontroller for the provision of the rate of progression of the thermal runaway.

8. The thermal runaway detection system of claim 1, wherein the battery controller is configured to turn at least one cell on or off, or control the voltage output of the at least one cell.

9. The thermal runaway detection system of claim 8, wherein the battery controller is configured to serve as the microcontroller.

10. The thermal runaway detection system of claim 1, further comprising a hydrocarbon detector configured for the detection of at least one selected from the group of: methane, esters, and ethane gases.

11. A battery thermal runaway detection system, comprising:

at least one a primary detector and configured to provide a sensed output in real time;

at least one secondary detector and configured to provide a sensed output in real time; and a combined microcontroller and battery controller electrically connected to the primary and secondary detectors, wherein the primary and secondary detectors are configured to differentiate between background and battery cell venting conditions, wherein the background condition is characterized by hydrogen and carbon dioxide concentrations of ambient atmospheric concentrations, wherein the battery cell venting condition is characterized by an elevation of hydrogen and carbon dioxide concentrations above ambient, wherein said combined microcontroller is further configured to send an alarm signal upon detection of a cell venting condition, and, wherein the combined microcontroller initiates, maintains, escalates, or ceases a response due to the alarm signal.

12. A battery thermal runaway detection system for use within a battery enclosure housing one or more batteries, the detection system comprising:

at least one a hydrogen sensor sensitive to at least 300 ppm configured to act as a primary detector and configured to provide a sensed output in real time;

at least one carbon dioxide sensor sensitive to at least 1000 ppm configured to act as a secondary detector and configured to provide a sensed output in real time; and a microcontroller electrically connected to the primary and secondary detectors, configured to determine power management and provide a signal conditioned output of a concentration detected by the primary and secondary detectors, and configured to turn at least one cell on or off, or control the voltage output of the at least one cell, wherein the primary and secondary detectors are configured to differentiate between background and battery cell venting conditions, and, wherein said microcontroller provides a rate of progression of the thermal runaway based on the provided information from said primary and secondary detectors.

* * * * *